(12) United States Patent
Jiang (10) Patent No.: US 11,719,617 B2
(45) Date of Patent: Aug. 8, 2023

(54) METHODS AND APPARATUS FOR SELF-TRIGGERING FLOW CYTOMETERS

(71) Applicant: CYTEK BIOSCIENCES, INC., Fremont, CA (US)

(72) Inventor: Wenbin Jiang, Danville, CA (US)

(73) Assignee: Cytek Biosciences, Inc., Fremont, CA (US)

(*) Notice: Subject to any disclaimer, the term of this patent is extended or adjusted under 35 U.S.C. 154(b) by 71 days.

(21) Appl. No.: 17/519,582

(22) Filed: Nov. 5, 2021

(65) Prior Publication Data

US 2022/0128452 A1 Apr. 28, 2022

Related U.S. Application Data

(63) Continuation of application No. 14/965,141, filed on Dec. 10, 2015, now Pat. No. 11,169,075.

(60) Provisional application No. 62/089,864, filed on Dec. 10, 2014.

(51) Int. Cl.
*G01N 15/14* (2006.01)
*G01N 21/64* (2006.01)
*G01N 15/10* (2006.01)

(52) U.S. Cl.
CPC ..... *G01N 15/1436* (2013.01); *G01N 15/1434* (2013.01); *G01N 15/1459* (2013.01); *G01N 21/645* (2013.01); *G01N 2015/1006* (2013.01); *G01N 2015/1486* (2013.01); *G01N 2021/6421* (2013.01)

(58) Field of Classification Search
CPC ....... G01N 15/1434; G01N 2015/1006; G01N 15/1484; G01N 2015/0065; G01N 2015/144; G01N 2015/149; G01N 15/1436; G01N 15/1459; G01N 2015/1486; G01N 21/645; G01N 2021/642; B01L 2200/0652; B01L 3/502761; C12M 47/04
USPC .............................................. 422/73; 436/10
See application file for complete search history.

(56) References Cited

U.S. PATENT DOCUMENTS

| | | | |
|---|---|---|---|
| 2003/0235919 A1* | 12/2003 | Chandler | G01N 15/1456 436/63 |
| 2005/0275839 A1* | 12/2005 | Robinson | G01J 3/2803 356/73 |
| 2012/0019825 A1* | 1/2012 | Thomas | G01N 15/1429 356/338 |

OTHER PUBLICATIONS

Vitali et al. "A Single-Photon Avalanche Camera for Fluorescence Lifetime Imaging Microscopy and Correlation Spectroscopy" IEEE Journal of Selected Topics in Quantum Electronics, vol. 20, No. 6, Nov./Dec. 2014, Date of publication Jun. 25, 2014 (Year: 2014).*

* cited by examiner

*Primary Examiner* — Dean Kwak
(74) *Attorney, Agent, or Firm* — Alford Law Group, Inc.; William E. Alford (57) ABSTRACT

A flow-cytometer has an excitation light source generating an excitation light that excites one or more bio-cells in a bio-sample carried by a flow path to luminesce. The flow-cytometer includes a spectrum dispersive element that disperses the luminescent light generated by the bio-sample into a photo-detector array. The flow-cytometer further includes a digital signal processor (DSP) that receives signals from the photo-detector array and generates a self-triggering signal based on the luminescent light generated by the bio-cells in bio-sample. The self-triggering signal triggers data capture in the DSP to improve synchronization with the data generated from signals received from the photo-detector array.

11 Claims, 3 Drawing Sheets

METHODS AND APPARATUS FOR SELF-TRIGGERING FLOW CYTOMETERS

CROSS REFERENCE TO RELATED APPLICATION

This patent application is a continuation claiming priority to United States (U.S.) patent application Ser. No. 14/965,141 titled SELF-TRIGGERED FLOW-CYTOMETER filed on Dec. 10, 2015 by inventor Wenbin Jiang, incorporated herein by reference for all intents and purposes, now issued as U.S. Pat. No. 11,169,075 on Nov. 9, 2021. Application Ser. No. 14/965,141 is a non-provisional patent application claiming the benefit of U.S. Provisional Patent Application No. 62/089,864, titled SELF-TRIGGERED FLOW CYTOMETER, filed on filed on Dec. 10, 2014 by Wenbin Jiang, incorporated herein by reference for all intents and purposes.

FIELD

The embodiments generally relate to flow-cytometers and their methods of manufacture, design, and use, and integration into systems.

BACKGROUND

Generally, flow-cytometry is a method for counting, examining, sorting, measurement of and characterization of various aspects of microscopic particles, bio-particles, bio-cells, and their derivatives to determine their physical and/or chemical characteristic via an optical and/or electronic detection apparatus. The early development of a flow-cytometry system was based on impedance and was developed by Wallace H. Coulter in 1953. Over the years, several developments where made by Mack Fulwyler, Wolfgang Gohde, and others that increased the system's useful acceptability into the marketplace. In today's conventional flow-cytometry, a flow-cytometer is generally based on the use of light in the visible spectrum.

Typically, a flow-cytometer is an analytical instrument that emits a certain frequency or frequencies of light that are directed toward a sample or samples. The light emitted from the light source excites the sample to emit a certain frequency or frequencies of light from the surface of the sample and in some cases from inside the sample. The frequencies of light that are emitted from the surface of the sample and in some cases emitted from the interior of the sample are collected and analyzed.

However, certain problems such as non-integration of certain parts into unitary whole or unitary design has made the adoption of conventional flow-cytometric machines slow to come into the marketplace. Also, conventional flow-cytometers may be inaccurate during counting and characterizing cells, bio-cells cells, and/or biologic materials, thereby limiting the use and potential usefulness of conventional flow-cytometric instruments. Moreover, the conventional design of a flow-cytometer can cause other problems such as in manufacturing, reliability, and the like which degrades the usefulness of conventional flow-cytometers in the marketplace. Further, the design of conventional flow-cytometers can limit the manufacturing capability and increase cost parameters thereby driving up costs of the overall manufacture and expense in the purchase of a flow-cytometer.

It can be readily seen that conventional flow-cytometers have several problems and disadvantages. Despite many potential advantages of flow-cytometry, market acceptance is limited, especially in portable and non-portable applications. Further, since some of the applications of flow-cytometry are high volume applications, the problems and disadvantages of conventional flow-cytometric technology may be ignored. Therefore, a low cost flow-cytometer system with high volume manufacturability and better efficiency is desirable.

SUMMARY OF THE INVENTION

In various representative aspects, the embodiments provide a flow cytometer having an excitation light source that illuminates and excites a bio-sample to luminescence. The luminescence is directed to a dispersal element that spatially spreads the wavelength spectrum over a plurality of photo-detectors. Analog signals from the photo-detectors are converted (digitized) into digital signals, captured, stored, and analyzed in a digital signal processing unit. The digital signal processing unit is directly and intimately in communication with the initial acquisition of the luminescence data by the photo-detectors allowing the flow-cytometer to be used as a counter.

BRIEF DESCRIPTION OF THE DRAWINGS

Representative elements, operational features, applications and/or advantages of the embodiments reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent to skilled artisans in light of certain exemplary embodiments recited in the Detailed Description, wherein:

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments. Furthermore, the terms 'first', 'second', and the like herein, if any, are used inter alia for distinguishing between similar elements and not necessarily for describing a sequential or chronological order. Moreover, the terms front, back, top, bottom, over, under, and the like in the Description and/or in the claims, if any, are generally employed for descriptive purposes and not necessarily for comprehensively describing exclusive relative position. Skilled artisans will therefore understand that any of the preceding terms so used may be interchanged under appropriate circumstances such that various embodiments of the invention described herein, for example, are capable of operation in other orientations than those explicitly illustrated or otherwise described.

DETAILED DESCRIPTION

Before addressing details of embodiments described below, some terms are defined or clarified.

The term "filter" is intended to mean any material or device that is capable of filtering, impeding, or preventing certain frequencies of light to pass thought the filter.

The term "emission detector" is intended to any device or material that is capable of detecting and/or sensing emission from the sample material. Typically, an emission detector can sense or detect a variety of frequencies. However, it should be understood that the emission detector can made to sense or detect on a single frequency of light or a small group of frequencies of light. Additionally, the emission detector can be made with a variety of emission detectors.

The term "sample" is intended to mean any material or materials, any biologic or non-biologic material that is capable of emitting light or being luminescent from the sample being exited from the source.

The term "bio-sample" is intended to mean any biologic material or materials, capable of emitting light or luminescing from the sample being exited from the source.

The term "bio-cell(s)" is intended to mean a fundamental biologic unit that can be alive and/or dead.

The term "cell(s)" is intended to mean a fundamental unit that can either be alive of not alive. By way of example only, but not limited to, a virus, a *mycoplasma*, or the like are sometimes hard to define.

The term "luminescence spectrum" is intended to mean a spectrum of bright lines, bands, or continuous radiation characteristics of and determined by a specific emitting substances subjected to a specific kind of excitation.

The term "luminescence signal capturing" is intended to mean the capture and recording of output signals from the illumination of the bio-sample by the light source which causes the bio-sample luminance at certain frequencies that allow certain characteristics to be identified and recorded.

The term "excitation light source" is intended to mean any suitable light source that is capable of illuminating a sample and emitting luminescence.

The term "flow path" is intended to mean any suitable liquid that is capable of suspending and carrying a sample to a region wherein the sample can be illuminated by the excitation light source.

The term "digital signal processor" (DSP) (also known as a Digital signal processing device) is intended to mean a specialized microprocessor (or a soft intellectual property block), with its architecture optimized for the operational needs of digital signal processing. Typically, the goal of DSPs is usually to measure, filter and/or compress continuous real-world analog signals.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the embodiments, in addition to those not specifically recited, may be varied or otherwise particularly adapted by those skilled in the art to specific environments, manufacturing specifications, design parameters or other operating requirements without departing from the general principles of the same.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of the embodiments, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources.

Figure 1:
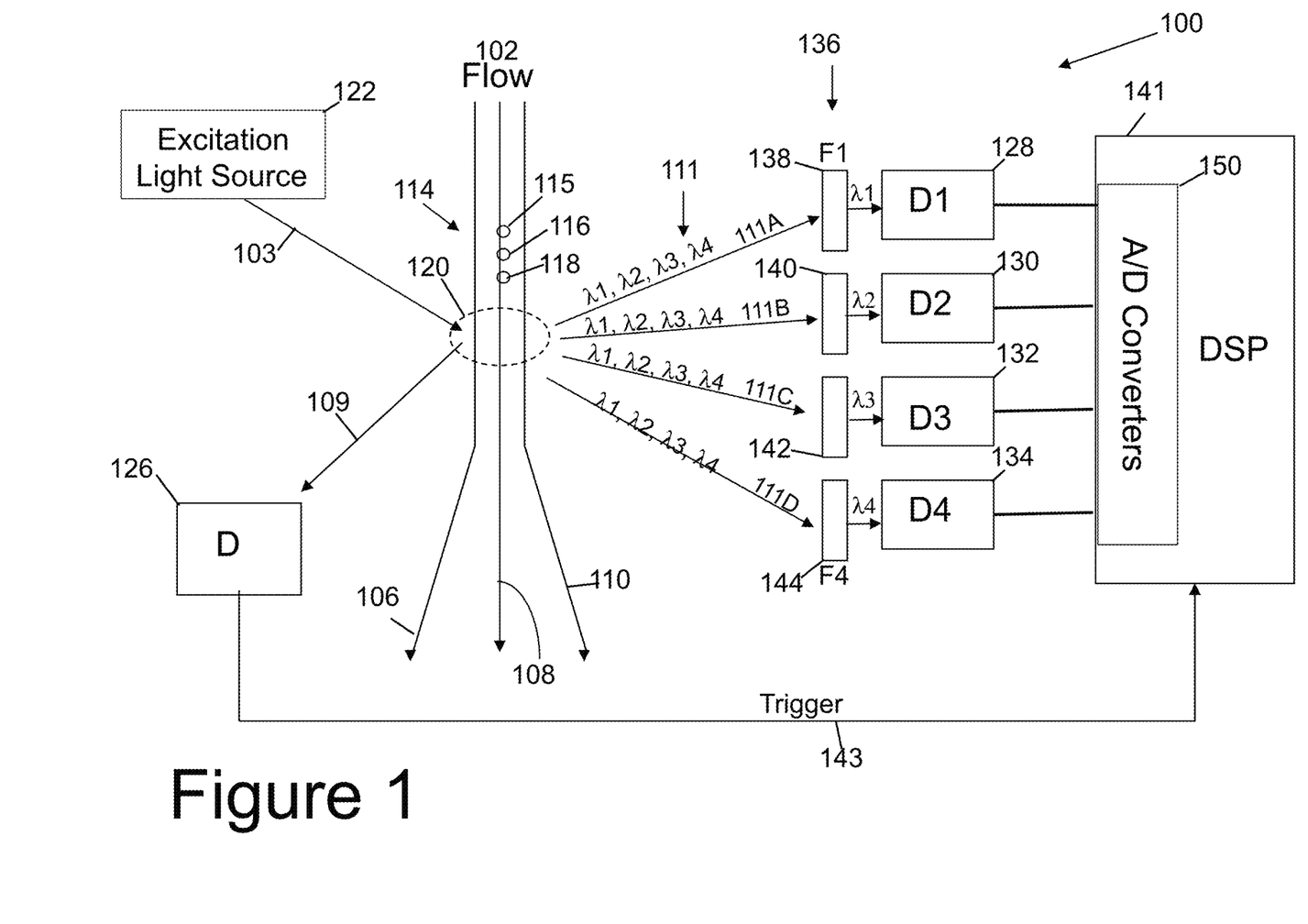
FIG. 1 is a schematic illustration of a conventional simplified flow-cytometer showing an excitation light source, a flow path, a plurality of multiple photo-detectors, multiple filters, multiple gates, and a digital signal processor, and a triggering device.

Referring now to FIG. 1, a conventional flow-cytometer 100 incorporating a conventional optical spectrum analyzer to analyze bio molecules is shown. The bio-molecules are excited by an excitation light 103 from an excitation light source 122 causing them to luminescence 111, as indicted by a plurality of arrow-headed lines. Such luminescence 111 can be generated either by auto-luminescence from the cell itself or by a color label tag, or marker, attached to the bio-cell or bio-cells. Information about the bio-cell or bio-cells can be obtained through the analysis of spectrum of the luminescence 111, which includes its wavelength distribution and intensity. Differences in wavelength distribution in the spectrum of luminescence indicates the presence of different bio-cells and/or markers on the bio-cell(s). Additionally, the excitation light 103 from the excitation light source 122 may be scattered by one or more of the bio-cells into a scattering light 109 as indicated by the arrow. The corresponding intensity of the scattering light 109 can also indicate the concentration of such distinct bio cells.

Typically, bio-samples 114 may include varieties of bio-cell molecules, each corresponding to a unique spectral distribution through either auto-luminescence generation or a labeled color tag. However, it should be understood that after the excitation light 103 interacts with the plurality of bio-samples 114 and other materials in region 120 of the flow path, luminescence 111 can occur, such as shown in FIG. 1. The luminescence 111 is a plurality of luminesces 111A-111D each having many different wavelengths (e.g., lambda one through lambda four) and intensities of wavelengths. The luminescence 111 (plurality of luminesces) is coupled into a plurality of filters 136 (e.g., filter F1 138, filter F2 140, filter F3 142 and filter F4 144) to filter out (reject) light of given wavelengths and pass through a selected wavelength or wavelength range of the luminescence.

To receive the filtered luminescence, the conventional flow-cytometer 100 incorporates multiple photo-detectors 128, 130, 132, and 134 such as photomultiplier tubes (PMTs) on the side of the flow path 102 opposite the excitation light source 122 as shown in FIG. 1. The excitation light 103 scattered off the bio-cells as scattered light 109 is received by another photo-detector 126. The photo-detector 126 is located on the same side of the flow path 102 as the excitation light source 122, as is shown in FIG. 1.

The filters 138, 140, 142, and 144 can be customized to receive and pass through the correspondent spectrum and intensity of selected wavelengths of luminescence 111 while rejecting the rest of the luminescence. One photo-detector for example, such as photo-detector 132, can thus receive luminescence of wavelength lambda 3 (λ3) that corresponds to one type of bio-cell molecule or marker on the bio-cell. Filter 142 rejects luminescence of wavelength lambda 1 (λ1), lambda 2 (λ2), and lambda 4 (λ4), for example As shown in FIG. 1, when bio-samples 114 are illuminated by excitation light source 122 different wavelengths of luminescence light 111 can be emitted by the one or more bio-cells with different markers. With the configuration of filters and photo-detectors spaced away from the region 120 and the bio-cells being excited differently, different intensities of luminesces 111A-111D with all of the different wavelengths of light can be directed to the plurality of filters 136. However, each filter 138,140,142,144 allows a certain wavelength or wavelength range of light to pass through to interact individually with its corresponding photo-detector 128,130,132,134, respectively.

Conventional flow-cytometer 100 includes a liquid flow path 102 containing bio-cell samples 114, shown as individual bio-cell samples 115, 116, and 118. The excitation light 103 is generated by an excitation light source 122, such as a semiconductor laser or LED, and is used to excite the bio-cell samples 114 in region 120 on flow path 102. When excited, the bio-cells at region 120 emit luminescence 111 and scatter some of the excitation light 103 as scattered light 109. The luminescences 111A-111D of luminescence light 111 can be respectively captured by each photo detector (e.g., photo detector 128,130,132,134) and separately analyzed by the DSP 141. Alternatively, the luminescences 111A-111D of the luminescence light 111 can be respectively captured by the plurality of photo-detectors (e.g., photo detectors 128,130,132,134) and collectively analyzed by the DSP 141.

It should be understood that photo detector 126 is configured to receive the scattered light 109 and not the luminescence light 111. Photodiode 126, on the opposite side of the flow path, is not positioned with the group of photo detectors 128,130,132,134 that receive luminescence light 111.

Figure 2:
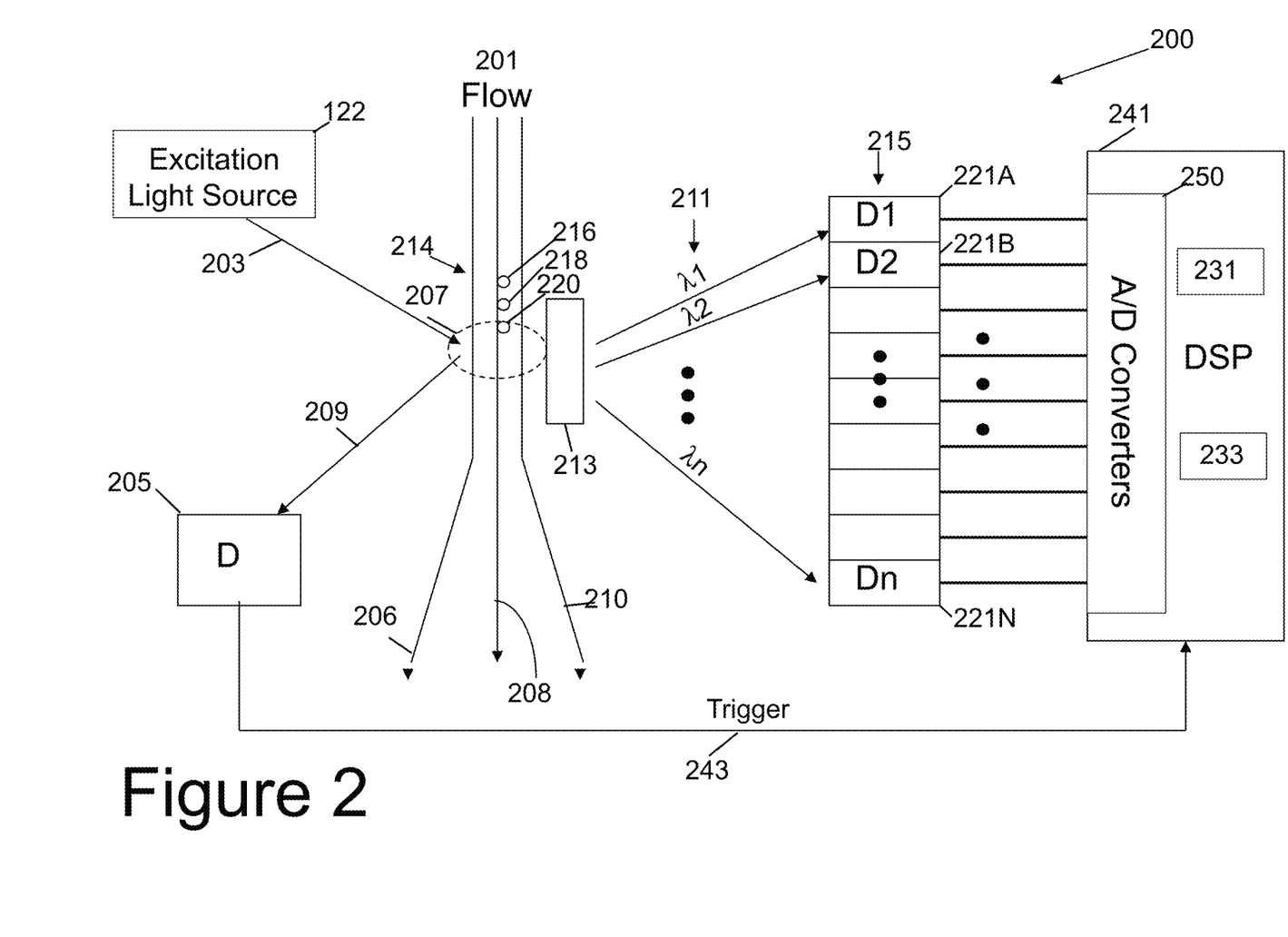
FIG. 2 is a simplified schematic illustration of an embodiment of a flow-cytometer showing an excitation light source, a flow path, a plurality of photo-detectors, a digital signal processor, and a triggering device.
Figure 3:
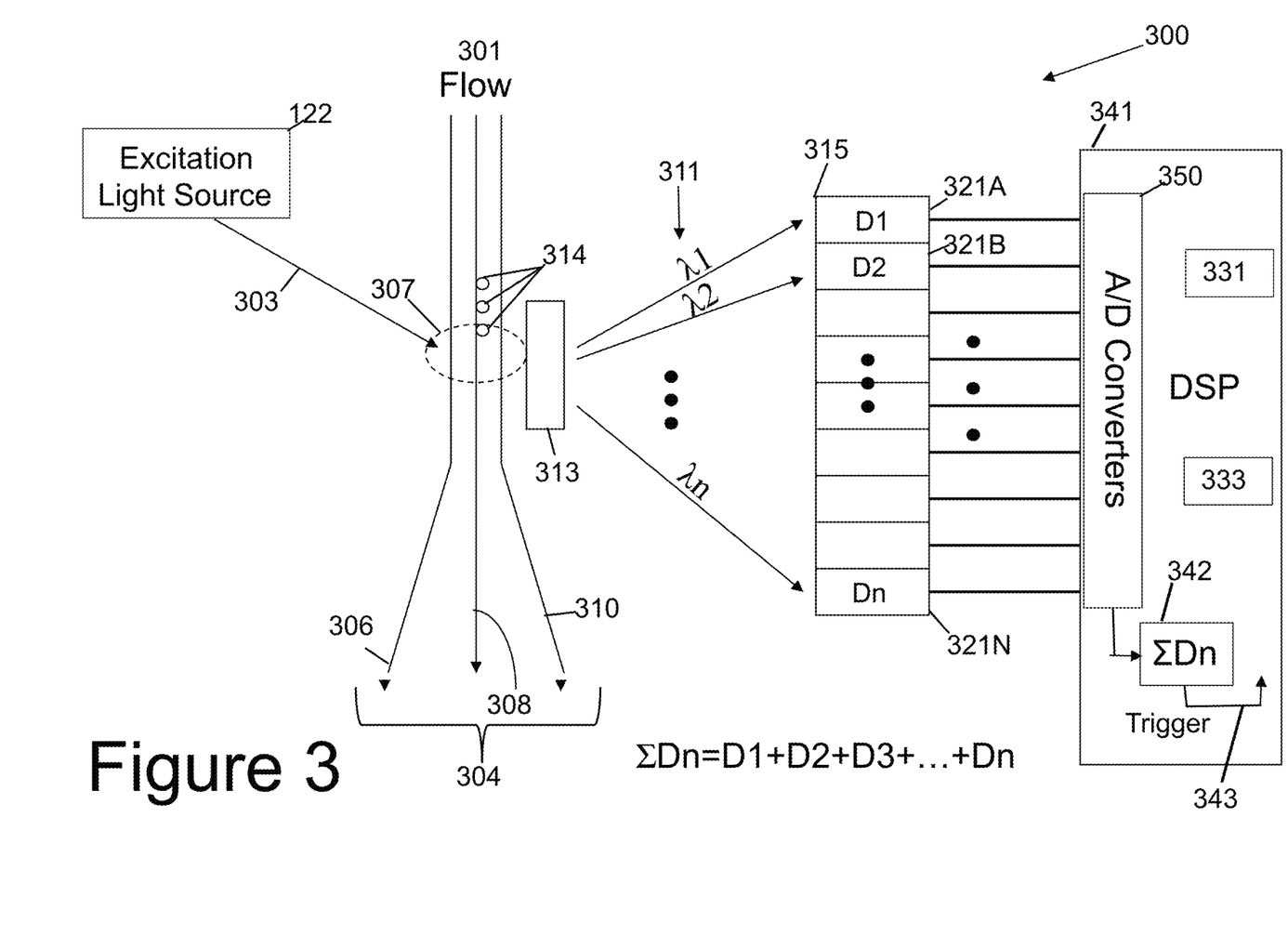
FIG. 3 is a simplified schematic illustration of another embodiment of a flow-cytometer showing an excitation light source, a flow path, a plurality of multiple photo-detectors, and a digital signal processor with an internal triggering device.

Typically, photo-detectors 128, 130, 132, and 134 with corresponding filters 138, 140, 142, and 144, respectively, work together to allow luminescence 111 of interest and its spectral contents to be detected by any individual photo-detector. The output analog signals of the photo-detectors 128, 130, 132, and 134 are digitized by multiple analog-to-digital (A/D) converters 150 into digital values that can be analyzed by the digital signal processor (DSP) 141 and its integrated circuitry. FIGS. 1-3 illustrate A/D converters 150,250,350 being part of the respective DSP 141,241,341. The A/D converters 150,250,350 can alternatively be implemented as part of the photo-detectors (within or without the photo-detector array) or as one or more separate components between analog outputs from the photo-detectors and digital inputs into the respective DSP 141,241,341.

The scattered light 109, which is scattered by the bio-sample in region 120, is captured by the photo-detector 126, which generates a triggering signal (trigger signal) 143. The triggering signal 143 triggers the DSP 141 to synchronize the luminescence 111 with signal capturing by using the scattered light 109. The triggering signal 143 starts signal capture of the digital values output by the A/D converters 150 representing the analog signals from the photo-detectors 128, 130, 132, and 134. The synchronization provided by the triggering signal also allows counting of the bio cells or markers on the bio cells, in addition to recording their emitted luminescence under light excitation by the excitation light source 122. Additionally, crosstalk between different markers can be compensated by complicated calibration procedures.

In conventional flow cytometers 100, it should be understood that different bio-cell molecules emit different characteristic luminescence due to its own unique auto-luminescence or the attached color labels. The luminescence spectrums may overlap with each other if they are too close to each other in wavelengths. In conventional flow-cytometers, the crosstalk limits the detection sensitivity and the simultaneous detection of multiple types of bio cells or markers on the bio cells.

Referring now to FIG. 2, a simplified schematic illustration of a flow-cytometer 200 is shown. FIG. 2 shows an excitation light 203 generated by an excitation light source 122, a plurality of photo-detectors 215 with N individual photo-detectors 221A-221N individually identified, a digital signal processor 241 with a digital storage space 231 and an analysis space 233, and an external triggering device (scattering light photo detector 205 with A/D converter). The digital storage space 231 stores data associated with the photo-detectors. The analysis space 233 provides a scratch pad to analyze data. The external triggering device generates an external digital trigger signal 243.

Further, as shown in FIG. 2, flow-cytometer 200 includes a liquid flow path 201 having a plurality of bio-samples 214, illustrated by individual bio-samples 216, 218, and 220. The plurality of bio-samples 214 are typically suspended in any suitable liquid, suspension, or liquid medium capable of carrying the plurality of bio-samples 214 to region 207. Typically, liquid flow path 201 is encased in an optically clear tube or vessel that allows the excitation light 203 to pass through the optically clear tube or vessel and strike the plurality of bio-samples 214 either singly or together. After the excitation light 203 has interacted with the plurality of bio-samples 214, luminescence and scattering occurs. With luminescence, the light has different wavelengths that are passed through the liquid flow path 201 towards a dispersive element 213. With scattering, the light is emitted from the liquid flow path 201 as scattered light 209 substantially retaining the original wavelength of the excitation light 203.

Generally, any suitable liquid suspension or liquid medium can be used such as, but not limited to, saline, five percent dextrose, buffering solution, or the like. As illustrated in FIG. 2, flow path 201 is indicated by a plurality of flow lines 204, identified individually and in part by flow lines 206, 208, and 210.

As shown in FIG. 2, excitation light source 122 generates the excitation light 203 that is used to illuminate region 207 wherein individual bio samples 216, 218, and/or 220 or the plurality of bio-samples 214 are illuminated as the bio-samples pass though region 207. Excitation light source 122 can be made of any suitable device such as, a light emitting diode, light emitting photo-diode, a laser, a semiconductor laser, or the like. Moreover, excitation light source 122 can be configured to produce any suitable wavelength or wavelengths of excitation light 203 that is desired. By way of example, after the plurality of bio-samples 215 are illumined by the excitation light source 122, the plurality of bio-samples luminescence at different wavelengths than the excitation light source 203.

Typically, the emitted light from the one or more excited bio-cells, referred to as luminescence, is due to absorption of the excitation light 203. The luminescence from the one or more excited bio-cells is dispersed in space by dispersive element 213 into multiple wavelengths that are then collected by any suitable photo-detector array or group of photo-detectors. As shown in FIG. 2, N individual photo-detectors 221A-221N can be configured so as to capture luminescence light individually or can be configured so as to capture the luminescence light together with a plurality of photo-detectors 215 depending upon the specific application and/or need. It should be noted and as shown in FIG. 2, that photo-detectors are illustrated as boxes (functional blocks) and have identifying numerical markings such as photo-detectors 221A-221N. However, in an attempt to show further robustness of the invention symbolic notation is used. For example, D1 and D2 symbolize a first and second photo-detector and Dn symbolizes a last photo-detector of any number. [WEA LEFT OFF HERE]].

In the flow-cytometer 200 shown in FIG. 2, a separate external photo detector 205 is used to capture the scattered light 209. The scattered light 209 is not luminescence in nature. Scattered light 209 is formed by the excitation light 203 scattering off of the one or more bio-cells in the region 207. Luminescence is the light emitted by the one or more bio-cells 216,218,220 through absorption of the excitation light 203.

Any suitable photo-detector device can be used as an instance of an individual photo-detector or a plurality of photo-detectors in a photo-detector array such as, but not limited to, semiconductor photo-detectors, Active-pixel sensors (APSs), Charged-coupled devices (CCD), or the like.

As shown in FIG. 2, an array of photo-detectors 215 can be used to record a full bio-molecule spectrum 211 dispersed spatially by dispersive element 213, such as a grating or a prism, as shown in FIG. 2. Luminescence spectrum of a color label or auto luminescence typically follows its own characteristic profile that can be pre-calibrated. When a bio-sample including multiple types of bio-cells is excited at region 207 by the excitation light 203, the characteristic luminescence profiles will overlap, and the plurality of photo-detectors 215 or photo-detector array 215 will record the combined luminescence spectrums 211 through the individual photo-detectors 221A-221N. As illustrated in FIG. 2, the luminescence spectrum 211 comprises a large number of different wavelengths of light, lambda 1 ($\lambda$1) through lambda n ($\lambda$n).

Additionally, it should be understood that any suitable sized array could be used depending upon the specific application. From the dispersion element 213, each photo-detector component 221A-221N receives a particular spectrum content of the spectrum distribution. As the characteristic luminescence spectrum of any particular color label and auto-luminescence has already been pre-calibrated, the distribution intensity for each bio cell can be de-convoluted from the combined spectrums through digital data processing, after the received analog signals are converted into digital data by the analog to digital converters 250 of the digital signal processor DSP 241. This will allow the use of more color labels closely spaced between each other in peak wavelength, thus increasing the types of bio-cells to be detected simultaneously without sacrificing the detection sensitivity. In this detection method, conventional hardware filters are not needed because the full spectrum intensity can be extrapolated and thus, a software filter can be used instead. One or more software filters can be implemented with digital data processing by the DSP 241 to obtain any data equivalent to the light filtering provided by a hardware filter (e.g., hardware filters 138,140,142,144) used in the conventional flow-cytometer 100. A software implementation of a hardware optical filter, referred to herein as a software filter, is also flexible and can be automated more easily. Thus, a software filter can simplify the overall flow-cytometer system thereby reducing both the manufacturing costs and the service costs.

With the photo-detector array detection scheme shown in FIG. 2, the analog data converted into digital data by the A/D converters 250 and captured by DSP 241 is synchronized by the conventional way by using scattered light. The scattered light 209 is received by a separate photo-detector 205 to generate the trigger signal 243. Bio samples 214 are usually complicated and include varieties of bio cells and particles, which will all scatter light. Some of those events are of interest and others are not. When using scattered light as a trigger for the array signal capture synchronization, all of those events are counted and generate captured data which increases the data storage space size and slows down the data analysis. When two events of interest are spaced too close in time during the analysis, those events can be discarded because the system cannot distinguish them as two separate valid events. Alternatively, luminescence light can be used to synchronize the data capturing. A separate photo-detector can be used to receive luminescence light and generate the trigger signal. In this manner, only events of interest are captured, thus improving the data analysis throughput. However, there are still two deficiencies in this approach of synchronization with luminescence:

a) When two events of interest are spaced too close to each other in timing, the system will miss one valid event.

b) Use of an extra separate photo detector for luminescence detection increases the flow-cytometer system manufacturing cost.

These deficiencies with using the dispersed luminescence light 211 can be overcome by using the photo-detector array 215 itself to self trigger the data capture and analysis. This self-triggering is possible because the photo-detector array 215 is designed to receive full luminescence signals without any optical filtering, such as shown in FIG. 2. When a valid bio cell or particle is excited by the excitation light 203, it will emit auto luminescence as the background in addition to the luminescence from the attached color label. As shown in FIG. 1, the conventional flow cytometer 100 removes certain unwanted luminescence using the plurality of optical filters 136 or any combination of individual optical filters 138,140, 142,144. Thus, a self-triggering methodology of capturing and synchronizing signals is not practical or possible with the conventional flow cytometer 100 shown in FIG. 1. However, because the flow cytometer 200 shown in FIG. 2 has a photo-detector array 215 with a plurality of photo-detectors 221A-221N, it can capture the complete optical spectrum of the luminescence 211, such that self-triggering becomes feasible.

Referring now to FIG. 3, a simplified schematic illustration of a self-triggered flow-cytometer 300 is shown. FIG. 3 shows the self-triggered flow-cytometer 300 having an excitation light 303 generated by an excitation light source 122, a flow path 301, a photo-detector array 315 with a plurality of photo-detectors 321A-321N, and a digital signal processor 341. The digital signal processor 341 has a digital storage space 331, an analysis space 333, and a triggering device 342. The digital storage space 331 stores data associated with the photo-detectors. The analysis space 333 provides a scratch pad to analyze data. The triggering device 342 generates a self-triggering signal 343.

As shown in FIG. 3, flow-cytometer 300 includes an excitation light source 122, a liquid flow path 301, a dispersive element 313, a photo-detector array 315, and a digital signal processor (DSP) 341. As illustrated in FIG. 3, the flow path 301 is indicated by a plurality of flow lines 304, identified individually and in part by flow lines 306, 308, and 310. The excitation light source 122 generates an excitation light 303 that excites one or more bio-samples 314 in region 307 in the flow path 301. The one or more excited bio-samples (bio-cells) emit luminescence.

The luminescence from the excited bio-samples, at least in part, is coupled into (strikes) the dispersive element 313. The dispersive element 313 can be any suitable dispersive element, such as a grating or a prism, that spatially spreads the luminescence spectrum 311 onto the photo-detector array 315. The photo-detector array 315 includes a plurality of photo-detectors 321A-321N. The photo-detectors in the photo-detector array 315 can be an avalanche photodiode (APD) or a PMT. The analog signal output from each photo-detector is coupled into a respective analog input of an analog-to-digital converter to digitize the analog signal. Accordingly, the plurality of photo-detectors 321A-321N are coupled to the analog-to-digital converters 350 of the digital signal processor 341. The N photo-detectors in the photo-detector array 315 can generate N analog output signals based on the spread of the luminescence spectrum 311. The N analog output signals of the photo-detectors 321A-321N are digitized by multiple analog-to-digital (A/D) converters 350 into N digital values that can be analyzed by the digital signal processor (DSP) 341. Like the DSP 241, the DSP 341 can implement one or more software filters with digital data processing to obtain any data equivalent to the light filtering provided by a hardware filter (e.g., hardware filters 138,140,142,144) used in the conventional flow-cytometer 100.

A flow-cytometer is initially calibrated before use. When no luminescence is generated by any bio-cell or bio-sample, all the digital values generated by multiple analog-to-digital (A/D) converters 350 based on the analog outputs of the photo-detectors are zero digital values (e.g., 00000000) when properly calibrated. When one or more bio-cells or bio-samples are excited to luminescence, one or more of the analog-to-digital (A/D) converters 350 generate a non-zero digital value (e.g., 00000001, 00010000, or 00110011 in binary). The change from a zero digital value to a non-zero digital value, upon receiving luminescence from one or more bio-cells, can be detected and used for synchronization to start the capture of digital values. When no luminescence is generated by any bio-cell or bio-sample, the output of all the analog-to-digital (A/D) converters 350 return to a zero digital value. The change back to a zero digital value can be detected and used to stop the capture process.

The digital signal processor (DSP) 341 includes an add-logic device 342 or programmed circuitry that can generate a trigger signal 343 for synchronization. The add-logic device 342 in the DSP 341 receives digital signals from all of the analog-to-digital (A/D) converters 350 that convert analog signals from the photo-detector array 315 based on the received luminescence. The add-logic device 342 generally combines or integrates all signals received from the plurality of photo-detectors in the photo-detector array 315, and generates a single trigger output signal 343, also denoted by the summation equation Dn. The symbol in the summation equation represents the sum of the digital converted values of the output signals from the plurality of photo-detectors 315 and is used to generate the trigger signal 343. If no luminescence has yet to be generated, the summation of the digital values by the add-logic 342 is a zero digital value and the trigger signal 343 is a logic zero. If luminescence light is then generated by an excited bio-cell and received by any one or more photo-detectors, the summation of the digital values by the add-logic 342 sum to a non-zero digital value, thereby causing the trigger signal 343 to transition to a logic one value. When the no further luminescence is generated, the summation of the digital values by the add-logic 342 returns to a zero digital value and the trigger signal 343 returns to a logic zero. Instead of summation, a bit-wise Boolean OR operation can be performed on binary bits of the digital data values to determine a transition of any bit from logic zero to logic one. The bit-wise Boolean OR operation can similarly be used to detect one or more bits having logic one value to all bits having logic zero values.

The trigger signal 343 is used to synchronize the data capturing by the DSP 341 of the digital values generated by the A/D converters and the photo-detectors of the photo-detector array. Being based on luminescence and not scattered light, the trigger signal Dn 343 output from the add-logic device 342 is in synch with the excitation light 303 generated by the excitation light source 303 whenever it encounters a bio cell of interest or marker on the one or more bio cells 314 in the flow path 301. When excited, the interested bio cell will emit either auto-luminescence or luminescence from the attached color label that is used to generate the trigger signal, thus enabling the cell counting of the events of interest while recording the associated luminescence spectrum for either in-situ or after-test data processing.

More sophisticated triggering can be adopted by the add-logic device 342 and the logical addition of selected digital signals generated from the analog signals output by the plurality of photo-detectors 315. The plurality of photo-detectors 315 allow the user to select individual photo-detectors 321A-321N in the photo-detector array 315, thus allowing selected bio-cells to be targeted for analysis, thereby improving system efficiency, and reducing detection error when analyzing such bio-cells. For example, only certain bio cells may be of interest during analysis. Knowing the color labels for these bio-cells, a subset of signals from one or more correspondent photo-detectors 321A-321N associated with those color labels can be selected for capture and trigger signal generation. The digital values of this selected subset of signals can be logically added or summed together (or bitwise ORed together) by the add-logic device 342 to generate the trigger signal 343 for synchronizing data capture of signals from just the selected one or more photo-detectors.

The use of the add logic device 342 of the DSP 341 with the photo-detector array 315 provides a simple and effective low cost self-triggered flow cytometer to capture complete spectrum information. With the self-trigger signal based on luminescence light and not scattered light, the self-triggered flow cytometer 300 can improve the throughput of cell counting while also allowing the operation in presence of large unwanted molecules without bio-sample washing and lysing, thus simplifying the sample preparation process.

The foregoing description is directed to exemplary embodiments and are not intended to limit the scope, applicability or configuration of the claimed invention in any way. Rather, the previous description is intended to provide convenient illustrations for implementing various embodiments. As will become apparent, changes may be made in the function and/or arrangement of any of the elements described in the disclosed exemplary embodiments without departing from the spirit and scope of the disclosure.

The foregoing specification has been described with reference to specific exemplary embodiments. It will be appreciated that various modifications and changes may be made without departing from the scope of the claims. The specification and figures are to be regarded in an illustrative manner, rather than a restrictive one and all such modifications are intended to be included within the scope of the embodiments. Accordingly, the scope of patent rights should be determined by the claims appended hereto and their legal equivalents rather than by merely the examples described above. For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the described embodiments and are accordingly not limited to the specific configuration recited in the claims.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the claims.

What is claimed is:

1. A flow cytometer analyzer comprising:
   at least one excitation light source having at least one light output;
   a flow path capable of carrying a bio-sample in a medium to a region in the flow path, wherein the bio-sample in the region is illuminated by the at least one light output and gives off luminescence;
   a spectrum dispersive element configured to receive the luminescence, wherein at least a portion of the luminescence given off by the bio-sample is directed to the spectrum dispersive element;
   a photo-detector array adjacent the spectrum dispersive element, the photo detector array having eight or more discrete semiconductor photo-detector devices arranged sequentially in a row, each of the discrete semiconductor photo-detector devices having a photo detection input and a photo detection output, wherein the spectrum dispersive element is arranged between the flow path and the photo-detector array to spatially disperse a spectrum of the portion of the luminescence over the eight or more photo detection inputs of the eight or more discrete semiconductor photo-detector devices in the photo-detector array;
   eight or more analog to digital converters with eight or more analog inputs respectively coupled to the eight or more photo detection outputs of the eight or more discrete photo-detector devices, wherein the eight or more analog to digital converters respectively convert eight or more analog signals on the eight or more photo detection outputs into eight or more digital signals representing digital data on eight or more digital outputs;
   a digital signal processor coupled to the eight or more analog to digital converters to receive the eight or more digital signals, the digital signal processor including
   a digital storage space with a digital input and a digital output, and
   an analysis space storing operands and results of calculations by the digital signal processor;
   and
   a digital trigger device coupled to the eight or more analog to digital converters and the digital signal processor, wherein the digital trigger device receives the eight or more digital signals representing digital data and based on the luminescence, generates a self trigger signal causing the digital storage space and the digital signal processor processing unit to respectively store and analyze the digital data from the eight or more analog to digital converters.

2. The flow cytometer analyzer of claim 1, wherein
   the bio-sample in the region, illuminated by the at least one light output, scatters a portion of the first light output as scattered light.

3. The flow cytometer analyzer of claim 1, wherein
   the at least one excitation light source is at least one laser diode with at least one laser light output.

4. The flow cytometer analyzer as claimed in claim 1, wherein
   the digital trigger device terminates generation of the self trigger signal causing the digital signal processor to end storage of digital data from the eight or more analog to digital converters based on a lack of luminescence.

5. The flow cytometer analyzer as claimed in claim 4, wherein
   the digital trigger device performs a logical add operation that sums together all digital bits of digital data from the eight or more analog to digital converters to initially detect a non-zero digital signal, generated by one or more of the eight or more analog to digital converters, to generate the self trigger signal.

6. The flow cytometer analyzer as claimed in claim 5, wherein
   the digital trigger device subsequently detects a zero digital signal generated by all of the eight or more analog to digital converters to terminate generation of the self trigger signal.

7. The flow cytometer analyzer as claimed in claim 4, wherein
   the digital trigger device performs a Boolean OR operation that logically ORs together all digital bits of digital signals from the eight or more analog to digital converters to initially detect a non-zero digital signal generated by one or more of the eight or more analog to digital converters, to generate the self trigger signal.

8. The flow cytometer analyzer as claimed in claim 7, wherein
   the digital trigger device subsequently detects a zero digital signal generated by all of the eight or more analog to digital converters to terminate generation of the self trigger signal.

9. The flow cytometer analyzer as claimed in claim 1, wherein
   the luminescence given off by the bio-sample is auto-luminescence.

10. The flow cytometer analyzer as claimed in claim 1, wherein
    the luminescence given off by the bio-sample is luminescence from a marker on a bio-cell.

11. The flow cytometer analyzer as claimed in claim 1 wherein each of the eight or more discrete semiconductor photo-detector devices in the photo-detector array is a discrete avalanche photo diode (APD).

\* \* \* \* \*